Figure 1:
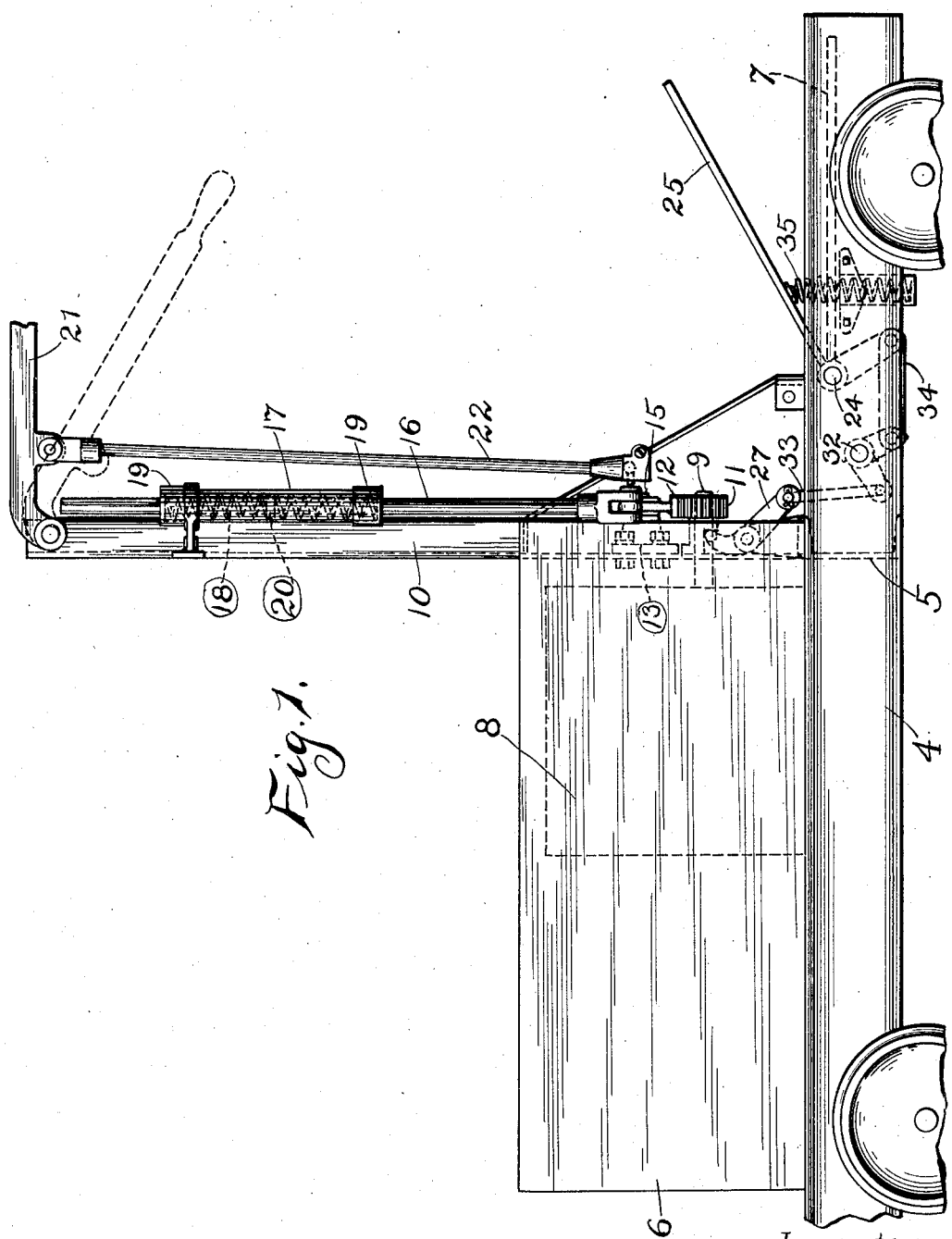

W. C. DYER.
SAFETY CONTROL MECHANISM.
APPLICATION FILED JAN. 23, 1918.

1,360,508.

Patented Nov. 30, 1920.
2 SHEETS—SHEET 1.

Inventor:
Walter C Dyer
By Lynn etc. Bradley Lechner Fowkes.
Att'y.

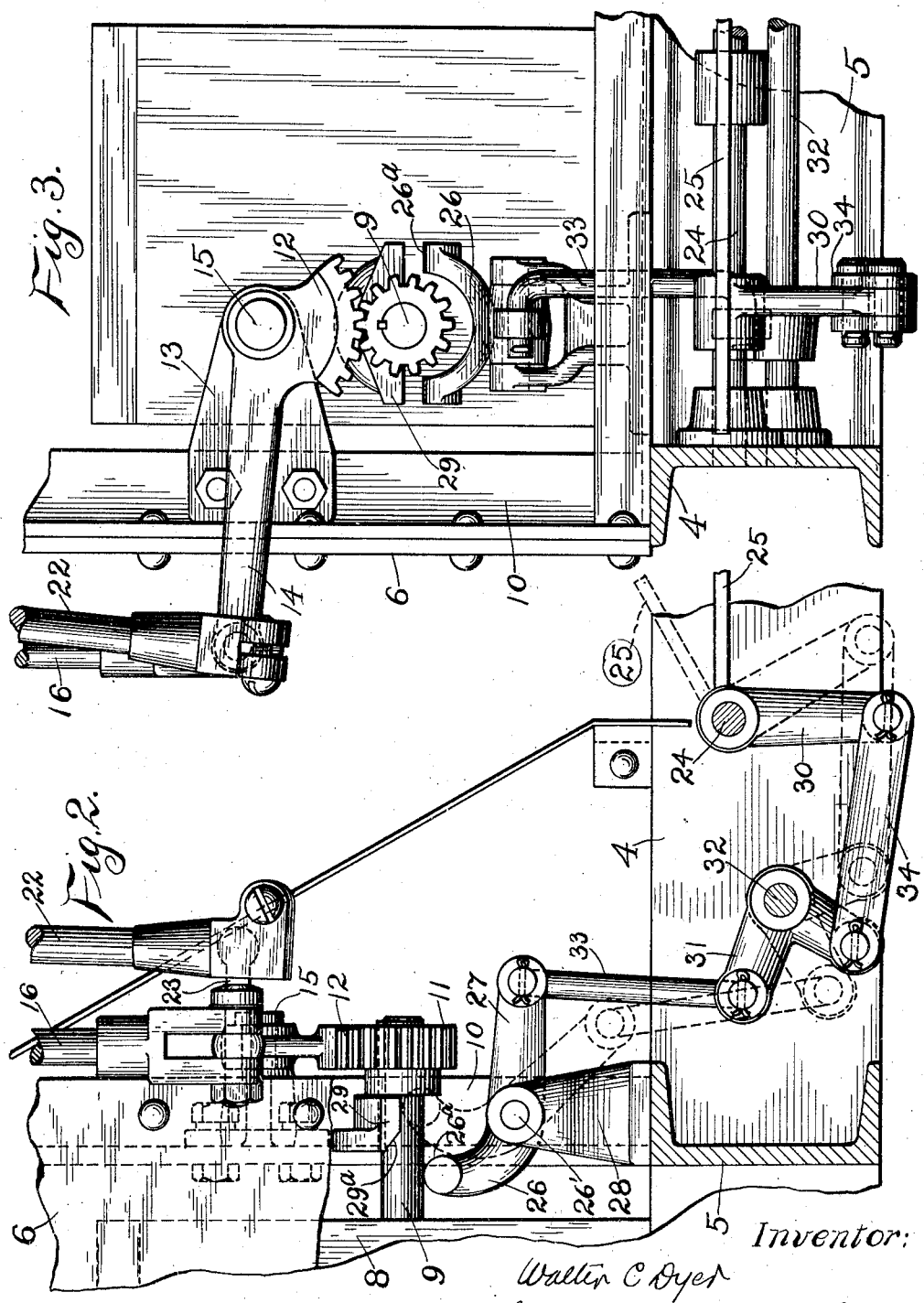

UNITED STATES PATENT OFFICE.

WALTER C. DYER, OF CHICAGO, ILLINOIS, ASSIGNOR TO BUDA COMPANY, OF CHICAGO, ILLINOIS, A CORPORATION OF ILLINOIS.

SAFETY CONTROL MECHANISM.

1,360,508.　　　　　Specification of Letters Patent.　　Patented Nov. 30, 1920.

Application filed January 23, 1918. Serial No. 213,308.

*To all whom it may concern:*

Be it known that I, WALTER C. DYER, a citizen of the United States, and residing at Chicago, in the county of Cook and State of Illinois, have invented certain new and useful Improvements in Safety Control Mechanism, of which the following is a specification.

My invention relates more particularly to electrically operated vehicles, shop trucks for example, and has for its main objects to provide locking means therefor capable of automatically locking the controller shaft of the drive in neutral position as the operator steps down from the vehicle, thereby reducing the liability of unauthorized operation of or tampering with the controller during his absence. The mechanism also provides for an automatic return of the controller from a driving position, either forward or reverse, to neutral, and which when locked cannot be actuated to forward or reverse until such time as the operator is in position to release the brake or drive the truck.

The invention also purposes to improve the construction and increase the efficiency and utility of trucks of this character, and furthermore contemplates the provision of certain novel and advantageous features of construction, combination and arrangement of certain parts as will be more fully described hereinafter, and pointed out in the claims.

These, together with such other objects as may hereinafter appear or are incident to my invention, I obtain by means of a construction illustrated in preferred form in the accompanying drawings, wherein:

Figure 1 represents a view in side elevation of a truck to which one embodiment of my invention is shown applied; and Figs. 2 and 3 are enlarged side and front views of said embodiment illustrating in detail portions of the same.

As has already been indicated, the invention has been primarily designed for employment with electrically operated or driven trucks for factory and shop use, and only so much of the truck itself has been illustrated as would be conducive to a clear understanding of the application generally of my invention to varying types and makes of the same.

Referring to the drawings, the reference numeral 4 indicates the longitudinal side frame members of the truck, 5 a connecting cross-piece, 6 the truck body carried by said frame members, 7 the operator's platform, 8 the battery controller box, 9 the rheostat or controller shaft extending rearwardly therefrom, actuation of which on short arcs in opposed directions from its neutral position provides for forward and reverse speeds of the truck in the manner well known to those skilled in the art, and 10 are vertical standards forming part of an upright frame secured in advance of the platform 7 to the rear portion of the truck body 6 and over the cross-piece 5.

The controller shaft 9 is terminally provided, rearwardly of the standard 10, with a pinion 11 with which meshes a segmental gear 12 pivotally mounted on a bracket 13 carried by said standard 10, said gear formed with a laterally extending lever arm 14, rocking of which on its pivotal boss 15 serves to impart opposite rotation to the shaft on short arcs. The neutral positioning of the parts referred to is clearly disclosed in Fig. 3, and in order to automatically maintain this relation I provide a rod 16 having substantially midway about it a housing 17, which is mounted in the standard 10, such housing carrying within it a double-acting or two-part compression spring 18 whose outer ends take against and seat in the terminal closure caps 19 of the housing and whose inner ends engage a collar 20 that is secured to the rod 16 centrally of the housing. This arrangement is such that the tendency of the spring is to maintain the parts in neutral position.

In order to rock the arm 14, a hand lever 21, having a connecting rod 22, is pivotally mounted on the upper end of the standard 10, the rods 16 and 22 being movably connected to the arm 14 preferably by means of a single pin 23 in the manner illustrated in Fig. 2. It will be obvious therefore that any lever movement in either direction to elevate or depress the lever arm 14, and thus actuate the controller, will encounter the pressure of the spring, the constant tendency of which will be to return the parts to normal position, and which return is automatically effected upon release of the lever by the operator in stepping down from the platform of the truck, as occasion may demand.

Disposed to one side of the stationary platform 7, and having its axis or shaft 24 mounted in the truck frame in the plane of the platform is a hinged depressible pedal 25 normally held in raised position by means of a spring 35, and which upon being depressed by the foot of the operator actuates a locking yoke member 26 through the medium of suitable lever mechanism and in a manner more particularly described hereinafter. This member 26 is provided with a rearwardly extending arm 27 and is pivotally mounted on a supporting bracket 28, disposed below the controller shaft 9, to swing on its pivot pin 26' from an inoperative position indicated in full lines in Fig. 2 to an operative locking position, shown therein in dotted lines, where it engages the underface of a corresponding locking element 29 at both sides of the shaft upon release of the pedal 25, to which said shaft the element is fixedly attached.

To rock the locking yoke member 26 I preferably provide a fixed depending arm 30 on the pedal shaft 24, and a bell-crank lever 31 which is mounted on a shaft 32 carried in the frame 5, the arms of said bell-crank lever respectively being associated with the said arms 27 and 30 by means of links designated in the drawings by the reference numerals 33 and 34.

Referring now more particularly to Fig. 2, and with the controller shaft in its normal or neutral position, the description thus far made indicates clearly, operatively considered, that the pedal 25 in rising, as the operator releases his foot, operates to swing the locking yoke 26 into engagement with the member 29 and in this manner serves to lock the controller shaft against rotation and, in turn, prevents actuation of the hand operated lever 21. This engagement is facilitated by providing the members 26 and 29 with cam faces 26ª and 29ª, the former exerting pressure upon the latter when the release of both pedal and lever has not been coördinated by the operator. The pedal and lever are so placed with respect to each other that the operator will in starting attain a driving position on the truck to first release the controller lock by depression of the pedal and then to actuate the controller shaft by manipulating the hand lever, in which case the locking member 26 in moving downwardly and forwardly on its pivot 26' clears the locking element 29 and thereby permits the actuation of the controller shaft to obtain truck movement. As previously stated, release of the lever and pedal effectively locks the controller shaft against actuation.

What I claim is:

1. In an electrically operated vehicle, the combination of a motor, a controller, a rotary controller shaft, means yieldingly holding the shaft in neutral position, a hand operated means for rotating said shaft, and means for locking said shaft in neutral position.

2. In an electrically operated vehicle, the combination of a controller shaft, actuating means for moving the shaft to its operative drive position, means coöperating with said last mentioned means for effecting an automatic return of the shaft to normal position, and a locking device adapted to lock the shaft in its normal position.

3. In an electrically operated vehicle, the combination of a controller shaft having an abutment formed thereon, actuating means capable of moving said shaft to its operative drive position, means coöperating with said last mentioned means for effecting an automatic return of the shaft to normal position, and a locking device constructed and arranged to lock with said abutment upon return of the shaft.

4. In an electrically operated vehicle, the combination of a rotary controller shaft therefor, hand operated actuating mechanism capable of moving said shaft from inoperative to operative positions, means common to said mechanism and said shaft for automatically returning the latter to inoperative position and a pedal actuating locking mechanism constructed and arranged for automatically locking said shaft only when moved to its inoperative position.

5. In an electrically operated vehicle having a rotary controller shaft, capable of assuming a neutral position, the combination of an abutment on said shaft, and a movable locking element adapted to swing from an inoperative position clear of said shaft to an operative locking position against said abutment when the shaft is at neutral position.

6. The combination with a rotary shaft having a lock element, a spring elevated pedal, a lock member actuated by said pedal and movable to engage said element when the pedal is in elevated position and to disengage therefrom upon depression of the element against the spring.

7. In an electrically operated vehicle, the combination of a motor, a controller, a rotary controller shaft, a hand operated means for rotating said shaft, a stand for the operator and movable means associated therewith for locking said shaft.

In testimony whereof I have hereunto signed my name to this specification.

WALTER C. DYER.